US010268411B1

(12) United States Patent
Dantkale et al.

(10) Patent No.: US 10,268,411 B1
(45) Date of Patent: Apr. 23, 2019

(54) POLICY AND HEURISTIC BASED CONVERSION OF WRITE-OPTIMIZED VIRTUAL DISK FORMAT INTO READ-OPTIMIZED VIRTUAL DISK FORMAT

(71) Applicant: Veritas Technologies LLC, Mountain View, CA (US)

(72) Inventors: Suhas Dantkale, Sunnyvale, CA (US); Satyendra Thakur, San Jose, CA (US)

(73) Assignee: Veritas Technologies LLC, Mountain View, CA (US)

( * ) Notice: Subject to any disclaimer, the term of this patent is extended or adjusted under 35 U.S.C. 154(b) by 638 days.

(21) Appl. No.: 14/945,310

(22) Filed: Nov. 18, 2015

(51) Int. Cl.
*G06F 3/06* (2006.01)
(52) U.S. Cl.
CPC .............. *G06F 3/064* (2013.01); *G06F 3/061* (2013.01); *G06F 3/067* (2013.01)
(58) Field of Classification Search
None
See application file for complete search history.

(56) References Cited

U.S. PATENT DOCUMENTS

| 7,406,578 | B2 * | 7/2008 | Burkey | G06F 3/0605 |
| | | | | 711/114 |
| 8,275,970 | B2 * | 9/2012 | Bolosky | G06F 3/061 |
| | | | | 711/170 |
| 8,700,674 | B2 * | 4/2014 | Bear | G06F 17/30312 |
| | | | | 707/802 |
| 8,874,859 | B2 * | 10/2014 | Vilayannur | G06F 3/0608 |
| | | | | 711/103 |
| 8,996,807 | B2 * | 3/2015 | Joshi | G06F 9/45558 |
| | | | | 711/100 |
| 9,015,559 | B2 * | 4/2015 | Shalvi | G06F 11/14 |
| | | | | 714/773 |
| 9,092,324 | B2 * | 7/2015 | Yano | G06F 12/0246 |
| 9,134,924 | B2 * | 9/2015 | Yano | G06F 12/0246 |
| 2007/0079060 | A1 * | 4/2007 | Burkey | G06F 3/0605 |
| | | | | 711/112 |

(Continued)

OTHER PUBLICATIONS

Webopedia, "Thin Provisioning", Nov. 3, 2007, pp. 1-2, https://web.archive.org/web/20071103131311/https://www.webopedia.com/TERM/T/thin_provisioning.html (Year: 2007).*

(Continued)

*Primary Examiner* — Christopher D Birkhimer
(74) *Attorney, Agent, or Firm* — Patent Law Works LLP (57) ABSTRACT

A method of converting a data format in a storage system is provided. The method includes identifying a condition for when to make a data conversion from a write-optimized virtual disk format to a read-optimized virtual disk format; and locating, in response to the identified condition, a version of data. The method may include moving the version of data to a thin-provisioned format in-place virtual disk and detecting a set of overwrites from a remaining set of versions of the data, including blocks of data having been previously overwritten. The method may further include compacting each block within the set of overwrites to create a contiguous block such that an associated physical memory space is reclaimed, wherein the read-optimized virtual disk format of the data includes the thin-provisioned format in-place virtual disk and the contiguous block.

20 Claims, 5 Drawing Sheets

(56) References Cited

U.S. PATENT DOCUMENTS

| | | | | |
|---|---|---|---|---|
| 2013/0036418 A1* | 2/2013 | Yadappanavar | ...... | G06F 3/0611 718/1 |
| 2014/0229662 A1* | 8/2014 | Yano | ................... | G06F 12/0246 711/103 |
| 2015/0193300 A1* | 7/2015 | Shalvi | ..................... | G06F 11/14 714/768 |
| 2015/0309728 A1* | 10/2015 | Yano | ................... | G06F 12/0246 711/103 |
| 2016/0306574 A1* | 10/2016 | Friedman | .............. | G06F 3/0619 |

OTHER PUBLICATIONS

Sun Oracle, "Achieving Superior Manageability, Efficiency, and Data Protection with Oracle's Sun ZFS Storage System", Dec. 2010, pp. 1-14, https://pdfs.semanticscholar.org/44fd/b4a7532f24cf86bbf2efcc3a147148eb0d91.pdf (Year: 2010).*

* cited by examiner

POLICY AND HEURISTIC BASED CONVERSION OF WRITE-OPTIMIZED VIRTUAL DISK FORMAT INTO READ-OPTIMIZED VIRTUAL DISK FORMAT

BACKGROUND

With exponential growth in bandwidth capacities and operational speeds, manufacturers must provide complex solutions for mass storage systems and networks, including that of virtualized storage systems. One of the ways in which manufacturers have addressed these complexities is to embed more powerful microprocessors within its designs in an effort to meet user demand. However, the faster speeds necessary for handling data in the application layer of the network has created a bottleneck for read/write access to storage devices included within these systems.

Although various techniques exist for write optimization of virtualized storage systems having non-volatile storage devices, where frequently-modified data can be stored in faster memory or using log-structured format to provide more efficient overall application data processing, write optimization comes at a cost to read performance. That is, although "write friendly" schemes exist where user data can be written to a disk at very high data rates, these schemes greatly impact the read performance of the attach and recovery features of a virtual disk (vdisk), making read performance not so "friendly" to the overall performance of the system. In particular, since the data is written in log-structured format, a large amount of small random Input/Output (I/O) requests must be made to the storage device in an effort to respond to each application read, making read performance latency sensitive. Ultimately, sequential reads to multiple versions necessary to read one version suffer due to multiple index traversals and multiple random reads across the hard disk drives (HDD) associated with each data node. However, during data recovery and data migration, each read must be serviced in real time. Thereby, these latency sensitive application reads' poor performance greatly hinders operations of virtualized storage systems. Additionally, these latency sensitive application reads trigger the existence of Quality of Service (QoS) violations in the compute plane of a virtualized storage system.

A general method for overcoming the aforementioned deficiencies is to build a hybrid file system, where writes are optimized by performing sequential Input/Output requests (I/Os) using a log and reads are performed using an extent based file system, which periodically synchronizes data. However, this method is not efficient in terms of cost and performance. Thereby, current data node storage systems do not alleviate this performance latency associated with write optimization. Yet, the ongoing data explosion of these systems requires continuous backup and a data access model compatible with such continuous backup, where read performance of the storage system must be swift. It is within this context that the embodiments arise.

SUMMARY

In some embodiments, a method of converting a data format in a virtual computing environment, wherein a write-optimized virtual disk format may be converted into a read-optimized virtual disk format is herein described. The method may include identifying a condition for when to make a data conversion from a write-optimized virtual disk format to a read-optimized ("read friendly") virtual disk format; and locating, in response to the identified condition, a version of data. The method may also include moving the version of data to a thin-provisioned format in-place virtual disk and detecting a set of overwrites from a remaining set of versions of the data, including blocks of data having been previously overwritten. The method may further include compacting each block within the set of overwrites to create a contiguous block such that an associated physical memory space is reclaimed. Thereby, the resulting thin-provisioned format in-place virtual disk and the contiguous block represent the read-optimized virtual disk format of the data.

In some embodiments, a storage system is provided. The system includes a memory and a processor operable to identify a condition for when to make a data conversion from a write-optimized virtual disk format to a read-optimized virtual disk format. The processor may be further operable to locate, in response to the identified condition, a version of data. Additionally, the processor may be operable to move the version of data to a thin-provisioned format in-place virtual disk and to detect a set of overwrites from a remaining set of versions of the data, including blocks of data having been previously overwritten. Further, the processor may be operable to compact each block within the set of overwrites to create a contiguous block such that an associated physical memory space is reclaimed, wherein the read-optimized virtual disk format of the data includes the thin-provisioned format in-place virtual disk and the contiguous block.

In some embodiments, a tangible, non-transitory, computer-readable media having instructions thereupon which, when executed by a processor, cause the processor to perform a method. The method includes identifying a condition for when to make a data conversion from a write-optimized virtual disk format to a read-optimized virtual disk format; and locating, in response to the identified condition, a version of data. The method may include moving the version of data to a thin-provisioned format in-place virtual disk and detecting a set of overwrites from a remaining set of versions of the data, including blocks of data having been previously overwritten. The method may further include compacting each block within the set of overwrites to create a contiguous block such that an associated physical memory space is reclaimed, wherein the read-optimized virtual disk format of the data includes the thin-provisioned format in-place virtual disk and the contiguous block.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

A virtual computing environment, having the ability to convert a write-optimized virtual disk format into a read-optimized virtual disk format is herein described. A system and related method for converting a write-optimized virtual disk format into a read-optimized virtual disk format are disclosed. The method includes identifying a condition for when to make a data conversion from a write-optimized virtual disk format to a read-optimized virtual disk format; and locating, in response to the identified condition, a version of data. The method may further include moving the version of data to a thin-provisioned format in-place virtual disk and detecting a set of overwrites from a remaining set of versions of the data, including blocks of data having been previously overwritten. The method may additionally include compacting each block within the set of overwrites to create a contiguous block such that an associated physical memory space is reclaimed, wherein the read-optimized virtual disk format of the data includes the thin-provisioned format in-place virtual disk and the contiguous block.

Figure 1:
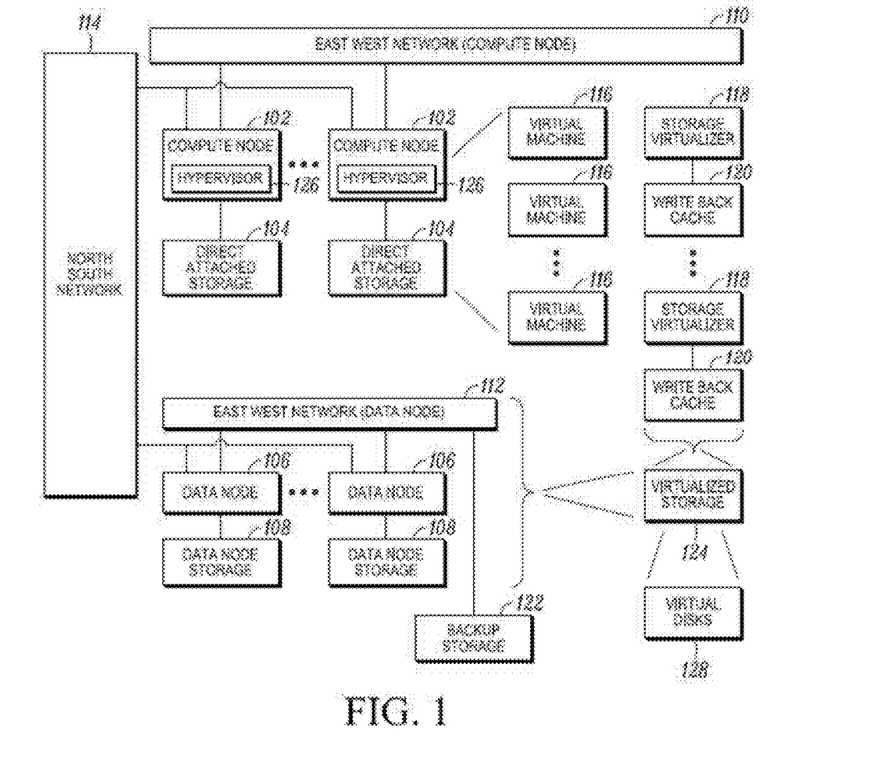
FIG. 1 is a block diagram of a computing and storage system that hosts virtual machines and one or more storage virtualizers, and performs read-optimized conversions in accordance with an embodiment of the present disclosure.

FIG. 1 is a block diagram of a computing and storage system that hosts virtual machines and one or more storage virtualizers, and performs read-optimized conversions in accordance with an example of an embodiment of the present disclosure. Various embodiments of the computing and storage system provide a storage cluster with a compute plane, a data management plane and a control plane, supporting virtual machines in a distributed manner. This system is fully scalable, such that data nodes and compute nodes can be added; applications can be added and managed; data can be migrated in and out; and virtual machines can be migrated in and out.

In particular, FIG. 1 is a block diagram of a computing and storage system that hosts virtual machines 116 and one or more storage virtualizers 118, and performs conversions of write-optimized virtual disk format into a read-optimized virtual disk format in accordance with an embodiment of the present disclosure. Compute nodes 102, with direct attached storage (DAS) 104, are coupled together by a network 110, in this example called the East-West network 110 for compute nodes. These interconnected compute nodes 102 are called a compute plane, or compute planes (depending upon how the virtual machines 116 are organized). The direct attached storage 104 of each compute node 102 is coupled to physical computing resources of that compute node (e.g., one or more processors), but is not coupled to other direct attached storages 104 of other compute nodes 102, or to other compute nodes 102 or resources outside of the compute nodes 102 except through the computing resources of the compute node 102 to which the direct attached storage 104 belongs. Data nodes 106, with data node storage 108, are coupled together by a network 112, in this example called the East-West network 112 for data nodes. These interconnected data nodes 106 are called a data plane or data planes (depending upon how virtual storage is organized). The compute nodes 102 are coupled to the data nodes 106 by a network 114, in this example called the north-south network 114.

Continuing with FIG. 1, the compute nodes 102, with direct attached storage 104, implement virtual machines 116. For example, hypervisors 126 in compute nodes 102 could assign physical computing resources, including processing resources and local memory, to virtual machines 116. One or more applications can execute on the virtual machines 116. For example, one virtual machine 116 could be serving a web application, while another virtual machines 116 could be serving database applications and one or more virtual machines 116 could be running a business application, etc.

One of the virtual machines 116 is a special type called a storage virtualizer 118. The storage virtualizer 118 has a writeback cache 120, which is implemented in the direct attached storage 104. There can be multiple storage virtualizers 118. In some embodiments, each compute node 102 implements a storage virtualizer 118 and a portion of a virtual machine 116, or one or more virtual machines 116, executing one or more applications. The storage virtualizer(s) 118, with writeback cache(s) 120, and the networked data nodes 106, with data node storage 108, implement virtualized storage 124, e.g., in the form of virtual disks 128, for the virtual machines 116.

In particular, the virtual machines 116 write application data through the storage virtualizer 118 to the writeback cache 120. The storage virtualizer 118 manages the writeback cache 120, and transfers incremental updates of the application data to the data nodes 106 as snapshots. Backups are performed by writing from the data nodes 106 to a backup storage 122, which is coupled to the data nodes 106 by the network 112. Further details of the computing and storage system of FIG. 1 may be found in U.S. application Ser. No. 14/284,070, entitled DATA MANAGEMENT TIER COUPLING PRIMARY STORAGE AND SECONDARY STORAGE, filed May 21, 2014, which is incorporated herein by reference for all purposes.

In operation, networked compute nodes 102, having DAS 104, implement virtual machines 116 and may transfer writes of data to the data nodes 102. These networked data nodes 102, having data node storage 108, cooperate with the storage virtualizer 118 having a writeback cache 120, which forms virtualized storage 124 in the form of virtual disks 128. The data nodes 102 may be comprised of a large number of hard disks (not shown) to implement the data node storage 108, where large blocks of data may be written. This ensures that the overall throughput associated with the write operation is very high, where a small amount of Input/Output requests (I/Os) exists. In order to generate a version of the data during the processing of an application in one embodiment, the storage virtualizer 118 may quiet (pause) an application I/O, insert an epoch marker into the writeback cache 120, and then resume the application I/O. In particular, an application, spanning one or more virtual machines 116 as an application consistency group, may use the writeback cache 120 for application I/O.

Using the log-structured format, data corresponding to each version may be dumped from the writeback cache 120 to the data node 106; wherein, the data may be written in linear fashion. The data, however, is not limited to being written in linear fashion or being logically contiguous. Further, an associated index may be maintained for each corresponding version. Accordingly, once a version is written, a new index may be generated for the next version. The index may be used to convert the logical address into a physical address. Thereby, each version is generated when an application writes the data in the compute plane within a circular buffer (not shown) on the compute node 102 and requests a snapshot of the data. Subsequently, a marker may be placed on a circular log associated with the compute node 102 and the data may be synchronized from the compute node 102 to the data node 106. This synchronization may occur periodically (i.e. every 15 or 30 minutes), where incremental changes (Δs) are recorded in each block of the version of data. That is, whatever change (Δ) may be returned in the cache 120, this value is stored in the associated block for each version.

In one embodiment, accessing a read of a data version may comprise a snapshot object on a compute node being linked to snapshot image data on the data node. Address translation is not limited to the use of an index. It may comprise the use of a table of page table entries that provides address translations from system virtual addresses to physical addresses for memory pages of the mapped memory space or some other mapping means. Data conversion may be initiated by any processor or controller in adherence to a policy or heuristics. Further, the processor or controller may be located anywhere within the virtualized storage system or externally coupled thereto. The processor or controller may exist within the compute node 102 or data node 106. Although the embodiment shown in FIG. 1 includes the read-optimized data conversion, the method for read-optimization may be implemented on any versioned secondary storage system; hence, the method proposed herein should not be construed as limited to only the embodiments set forth.

Figure 2:
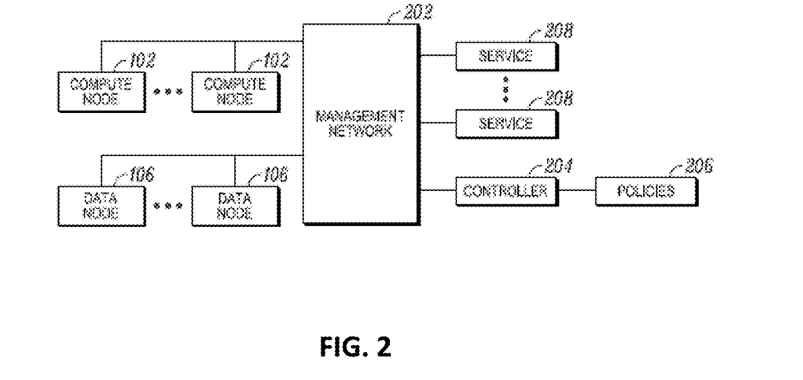
FIG. 2 is a block diagram showing a management network coupled to compute nodes and data nodes of the computing and storage system of FIG. 1, and a controller in or coupled to the management network, which implements policies relating to performance of read-optimized conversions.

FIG. 2 is a block diagram showing a management network 202 coupled to compute nodes 102 and data nodes 106 of the computing and storage system of FIG. 1, and a controller 204 in or coupled to the management network 202, which implements policies 206 relating to read-optimized conversions. The management network 202 spans the compute and data planes, and defines a management or control plane. Although the north-south network 114 couples the compute nodes 102 and the data nodes 106 for purposes of data transfer, the management network 202 couples the compute nodes 102 and the data nodes 106 for purposes of managing these. Particularly, the controller 204 communicates with the storage virtualizer(s) 118, which are implemented in the compute nodes 102, and communicates with the data nodes 106 for specific tasks relating to read-optimization operations, which the controller 204 directs through the management network 202. One or more services 208 may also be coupled to the management network 202. In various embodiments, these services 208 may coordinate the entire cluster, and may be open stack permitted. One or more services 208 could manage the hypervisors 126, manage storage and latencies, or direct where data should be dumped, e.g., direct compute nodes 102 to data nodes 106.

Policies 206 may comprise a group of rules for determining when the read-optimized conversion should be made. Policies 206 may also comprise heuristics, including a set of rules for an approximate hypothetical of when it is best to perform the read-optimized conversion. In particular, the data conversion may be initiated by controller 204 in adherence to a policy, or by a user through a user interface administered by the controller. More particularly, the policy rules may include a rule that a read-optimized conversion is performed upon user-specified conversion request. In the alternative, the policy may include a rule relating to the initiation of the read-optimized conversion based upon an application-specified conversion request, where a host coupled to the system includes an application that request the data conversion. Further, the policy may include a rule that the read-optimized conversion is made upon initiation of data recovery associated with a predetermined version or that the read-optimized conversion is made upon request to delete a version of data. Another rule may include data conversion for versions that comprise a large predetermined portion of overlapping data from previous versions. This results in creating optimized space usage, since the overlapping data will not need to be copied or moved.

Furthermore, a rule associated with the heuristics may designate that data conversion is made for data files above a predetermined size, where a controller or processor calculates the size of each file and automatically initiates a data conversion based upon the size. Heuristics may also designate that the read-optimized conversion be made for data having a small predetermined number of overwrites or that the read-optimized conversion is made for data having a large predetermined number of random writes. In addition, heuristics may include a rule that the read-optimized conversion is made periodically at a predetermined time. This predetermined time may correspond with system backups. The aforementioned list of rules for the policy and the heuristics is not an exhaustive list. There are a number of alternative rules that may be included in the policy and heuristics, hence the method proposed herein should not be construed as limited to only the embodiments set forth.

Figure 3:
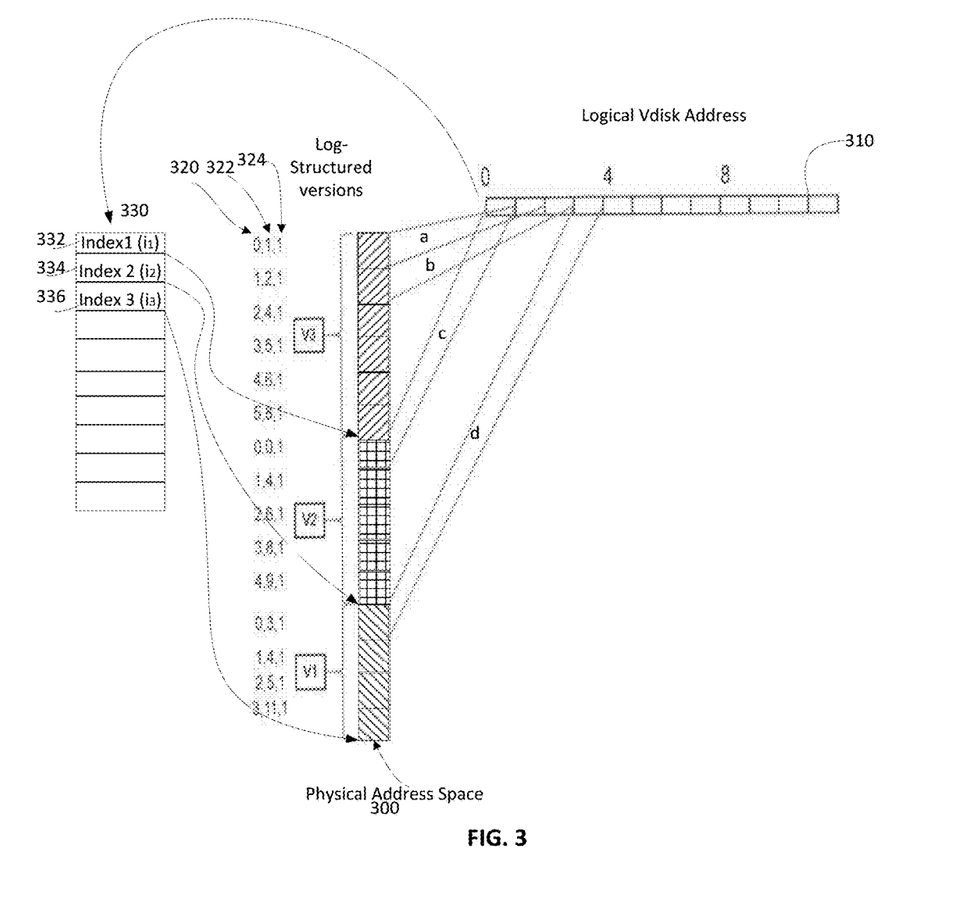
FIG. 3 is an address and data offset diagram illustrating address translation and the manner in which data is read from a write-optimized virtual disk format prior to read-optimized virtual disk format conversion.

FIG. 3 is an address and data offset diagram illustrating address translation and the manner in which data may be read by data node 106 of FIG. 1 from a write-optimized virtual disk format prior to conversion to a read-optimized virtual disk format according to one embodiment. In particular, one example of a storage system includes a data node storage layer that stores different versions of data (V3, V2, and V1) written in log-structured format on a vdisk at physical address space 300. Additionally, this data node may maintain an index 330 associated with each version (V3, V2, and V1), where each version of the virtual disk overlays an earlier version of the vdisk as shown (where V1 is the earliest version, V2 is a later version, and V3 is the latest version).

During a read of one of the versions prior to the read-optimized conversion, the data node refers to the logical address 310 and index 330 for each one of the underlying versions to get to a selected version in descending order, where the latest version is located in a first set of blocks in the physical address space 300. Particularly, for example, the data node may need to refer to the logical address 310 for each of the underlying versions V2 and V1 in order to read version V3. That is, since the data is written in log-structured format, a large amount of small random I/O requests must be made by the data node to a data node storage coupled thereto in an effort to respond to an application read. In this particular example, blocks a, b, c, and d represent the blocks that must be accessed in order to read one version (V3) of data. Yet, during data recovery and data migration, these reads must be serviced in real time. Thereby, due to the log-structured format, these reads are latency sensitive, making data recovery or migration of the vdisk to severely lag in performance.

As noted above, address translation of the logical virtual disk address 310 into a physical address space 300 corresponding to data being stored in a nonvolatile solid-state storage may use an index 330 in some embodiments. In the particular example shown of FIG. 3, the first index $i_1$ at index node 332 contains the pointer to the physical address space 300 for the latest version V3. Accordingly, index $i_2$ and $i_3$, at index nodes 334 and 336, contain pointers to the physical address spaces associated with versions V2 and V1, respectively. In the alternative, the data node may maintain a mapping table or some other mapping means for address translation in lieu of index 330.

Figure 4:
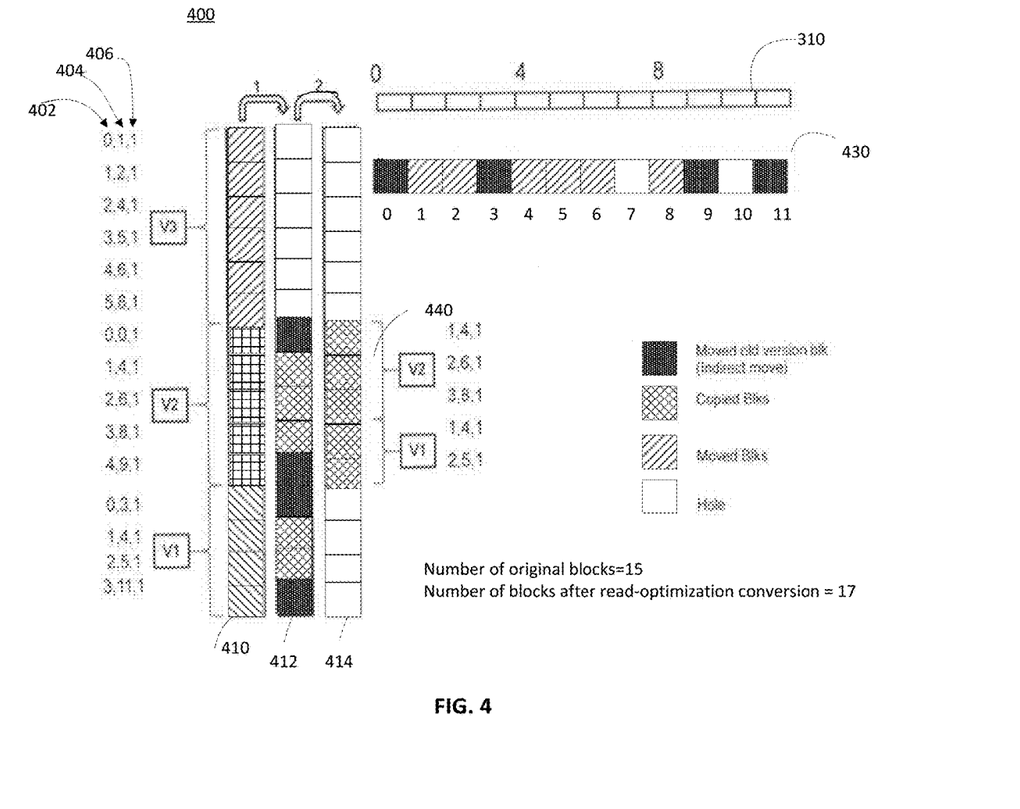
FIG. 4 is a block diagram illustrating conversion of the write-optimized virtual disk format into a read-optimized virtual disk format.

FIG. 4 is a block diagram of conversion of the write-optimized virtual disk format into the read-optimized virtual disk format in an example embodiment. After identification of whether the read-optimized conversion is to be made, the read-optimization conversion process may begin with a translation of the logical address 310 using an index 330 as shown with respect to FIG. 3. Consequently, after the address translation occurs with respect to each version V3, V2, and V1 (a described with reference to FIG. 3 above), data conversion may be initiated by any processor or controller in adherence to a policy or heuristics. The processor or controller may be located within the virtualized storage system as shown in FIG. 2 or externally coupled thereto (not shown). As noted previously, data stored in a data node may be stored in the log-structured format to provide different stored versions of the data. Upon triggering of an event (based upon the various policies as described below with respect to the method of FIG. 5), a selected version of a write-friendly vdisk format may be moved to a thin-provisioned in-place vdisk 430. In addition, the untouched data of other associated versions may be selectively moved to the thin-provisioned in-place vdisk format in accordance with the logical offset of each block to be described in detail below. For optimization purposes, only data which must be retained will be duplicated. That is, data from any version that is merely replicated without a change from one version to the next need not be copied or duplicated. Finally, all of the remaining blocks corresponding to the associated versions may be copied and compacted to form a contiguous block of data. Ultimately, the thin-provisioned in-place vdisk format and the contiguous block represent the read-optimized virtual disk format.

As shown, each block of data within each version, V3, V2, and V1, has an associated physical address offset for the virtual disk as shown in column 402. Additionally, each block has a logical address offset for the virtual disk as shown in column 404 and an Input/Output (I/O) size as displayed in column 406. The grouping of the virtual disk address offsets, 402 and 404, and the data block size 406 may be presented as a tuple (i.e. physical address offset, logical address offset, I/O size). For this particular embodiment, the I/O size is set to 1 block of data. Alternatively, the I/O size may be set to any number of blocks.

Prior to the start of the method for the conversion from write-optimized virtual disk format to read-optimized virtual disk format, each version is stored in the physical address space as shown in column 410. Each one of these versions may then be located by the processor or controller. Notably, columns 410, 412, and 414 are representative of the same physical address space taken at various points in time during the conversion process described herein. In FIG. 4, for simplicity of distinguishing one block of data from another, version V3 has the right diagonal line fill pattern, version V2 has the grid line fill pattern, and version V1 has the left diagonal line fill pattern. Based upon the logical address offset 404 for each block provided in the corresponding tuple each block of the selected version V3 is moved by the processor or controller to the thin-provisioned in-place virtual disk 430 to be placed in a corresponding block. That is, each of the blocks is placed in a sequential fashion based upon the logical address offset 404. For example as shown, the first block has a tuple of "0,1,1", where "1" holds the second position of the tuple, which represents the logical offset. This means that the first block may be placed in the "$1^{st}$" position of the thin-provisioned in-place virtual disk 430 as shown. The second block has a tuple of "'1,2,1," where the logical offset is "2." This means that the second block will be placed in the "$2^{nd}$" position of the thin-provisioned in-place virtual disk 430. The third block has a corresponding tuple of "2,4,1" and a logical offset of "4;" therefore, it will be placed at the "$4^{th}$" position of the thin-provisioned in-place virtual disk 430. The fourth, fifth and sixth block of version V3 have corresponding tuples of "3,5,1," "4,6,1," and "5,8,1," where the respective logical offsets are "5," "6," and "8." Therefore, these will be placed at the "$5^{th}$", "$6^{th}$", and "$8^{th}$" positions of the thin-provisioned in-place virtual disk 430 as shown in FIG. 4.

The processor or controller may then make the determination whether the remaining versions include blocks that have not been overwritten. In this implementation, only the non-overlapping blocks will be copied to the thin-provisioned in-place virtual disk 430 by the processor or controller. As shown, the blocks with the hash mark pattern in versions, V2 and V1, have not been overwritten as shown in column 412. In particular, these may be identified by a processor or controller of the data node 106 or compute node 102. These blocks that have not been overwritten are moved to the thin-provisioned in-place virtual disk. In addition, the corresponding indexes, i2 and i3, are modified so that any further reads of versions, V2 and V1, are pointed to 430 instead of 410, 412, and 414. As mentioned earlier, columns 410, 412, and 414 are representative of the same physical address space taken at various points in time during the conversion process described herein. In particular as shown, these untouched blocks of versions, V2 and V1, have a dark dotted pattern as shown in column 412. More particularly, according to this example embodiment, the first block of the version V2 has a tuple of "0,0,1," which means the logical offset of the block is "0." This means that this block will be moved to the corresponding location of the thin-provisioned in-place virtual disk 430 at the "$0^{th}$" position. The fifth block of the version V2 also has not been overwritten and has a tuple of "4,9,1." Therefore, the corresponding logical off set of this fifth block is "9," which means that it will be written to the corresponding location of the thin-provisioned in-place virtual disk 430 at the "$9^{th}$" position. The first and fourth block of version V1 have not been overwritten as well and include respective tuples of "0,3,1" and "3,11,1." Each of these blocks have a corresponding logical offset of "3" and "11" therefore, these will be placed in the "$3^{rd}$" and "$11^{th}$" place of the thin-provisioned in-place virtual disk 430 as shown.

The remaining overwritten blocks from versions V2 and V1 are shifted to be compacted together as shown in column 414 transitioning from column 412 to form the compacted contiguous block 440. In particular for the example shown in FIG. 4, compaction means that the blocks with corresponding tuples of "1,4,1," "2,6,1," "3,8,1" for V2 and "1,4,1" and "2,5,1" for V1 are placed in contiguous space 440. During this compacting phase, the overlapping data space associated with the remaining versions gets reclaimed, where the physical memory space is free and may be useable to store other data. The reclaimed blocks are shown as white solid blocks. Additionally, indices i2 and i3 are modified. Further, after the compaction each corresponding physical address offset may be changed to represent the new position corresponding to each version in the contiguous space 440. For example in version V2, tuples "1,4,1," "2,6,1," and "3,8,1" become "0,4,1," "1,6,1," and "2,8,1", respectively. Each of the physical address offsets "1" "2" and "3" are now "0", "1" and "2", respectively because they are now located in these offset positions of the contiguous space 440. Similarly in version V1, tuples "1,4,1" and "2,5,1" become "0,4,1" and "1,5,1", respectively. Ultimately, the thin-provisioned in-place virtual disk 430 and the compacted contiguous block 440 represent the converted read-optimized virtual disk format. The one terabyte virtual disk format includes 12 blocks for the thin-provisioned in-place virtual disk 430, while the compacted contiguous block 440 of this example embodiment includes 5 blocks of data. Thereby, the 12 blocks and the 5 blocks represent the total number of blocks (12+5=17) after the read-optimized conversion. The original number of blocks is represented by the 15 blocks which make up each of the versions of data, V3, V2, and V1.

As an advantage, since data conversion occurs mostly during version deletion or compaction, the Input/Output Operations Per Second (IOPS) overhead becomes amortized. Further, the IOPS overhead will not directly impact the compute plane, since the IOPS can be scheduled during periods of minimal usage ("quite time"), where spare CPU and memory cycles exist. Although there is a slight IOPS overhead cost with the read-optimized virtual disk format, this is the tradeoff for generating improvement in terms of latency and recovery throughput. Thereby, the read-optimized virtual disk conversion results in better read performance without impacting the performance of writes or generating substantial storage overhead.

Figure 5:
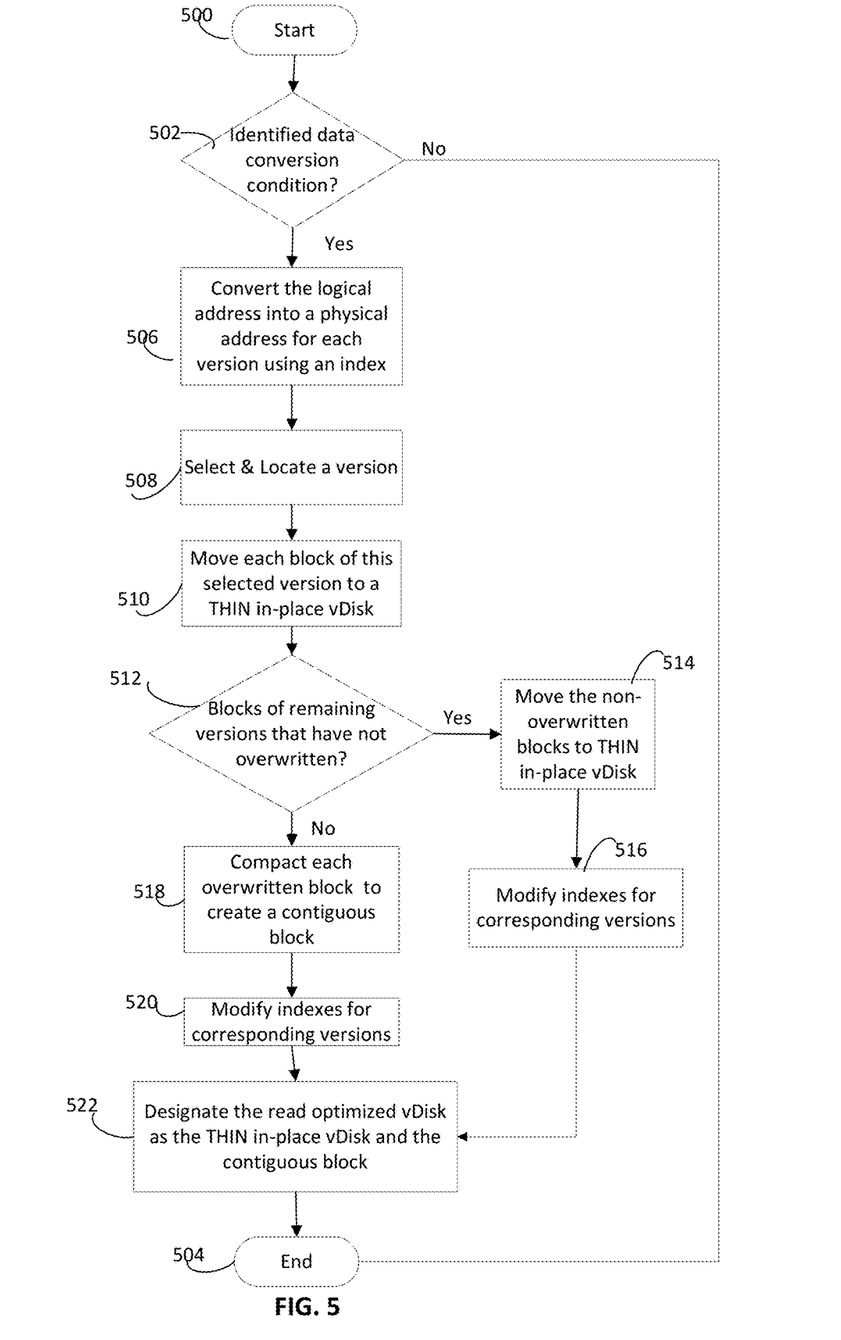
FIG. 5 is flow chart for conversion of the write-optimized virtual disk format into a read-optimized virtual disk format.

FIG. 5 is flow chart of a method for converting a write-optimized virtual disk format into a read-optimized virtual disk format, which can be practiced on the system of FIGS. 1, 2 and 4 and variations thereof. The method can be practiced by various processors, such as processors in compute nodes, in data nodes, and in a controller coupled to the compute nodes and the data nodes as shown in FIG. 2.

The method starts at node 500 and proceeds directly to a decision action 502, where identification is made by a controller or processor, using software, and/or hardware logic. In particular, it is determined whether the data conversion from write-optimized virtual disk format to read-optimized virtual disk format should be made in accordance with a predetermined policy and/or heuristics provided herein. The policy may comprise a group of rules for determining when the read-optimized conversion should be made. The heuristics may include a set of rules for an approximate hypothetical of when it is best to perform the read-optimized conversion. The identification step can have an affirmative result for a policy rule. The policy rules may include a rule that a read-optimized conversion is performed upon user-specified conversion request. In particular, the data conversion may be initiated by a controller in adherence to a policy, or by a user through a user interface administered by the controller. In the alternative, the policy may include a rule relating to the initiation of the read-optimized conversion based upon an application-specified conversion request, where a host coupled to the system includes an application that request the data conversion. Further, the policy may include a rule that the read-optimized conversion is made upon initiation of data recovery associated with a predetermined version or that the read-optimized conversion is made upon request to delete a version of data. Another rule may include data conversion for versions that comprise a large predetermined portion of overlapping data from previous versions. This results in creating optimized space usage, since the over-lapping data will not need to be copied or moved.

Furthermore, the read-optimized conversion can be an affirmative result of heuristics including but not limited to a set of rules. A first rule may designate that data conversion is made for data files above a predetermined size, where a controller or processor calculates the size of each file and automatically initiates a data conversion based upon the size. Heuristics may also designate that the read-optimized conversion be made for data having a small predetermined number of overwrites or that the read-optimized conversion is made for data having a large predetermined number of random writes. In addition, heuristics may include a rule that the read-optimized conversion is made periodically at a predetermined time. This predetermined time may correspond with system backups. The aforementioned list of rules for the policy and the heuristics is not an exhaustive list. There are a number of alternative rules that may be included in the policy and heuristics, hence the method proposed herein should not be construed as limited to only the embodiments set forth.

When the result of the identification of the data conversion condition is affirmative, the action 506 is performed to initiate the data conversion process and convert the logical address corresponding to each version of the data associated with the write-optimized virtual disk format into a physical address, where a version represents a snapshot in time when the data is recorded. In particular, the difference for each block or delta (Δ) may be recorded at each block of each associated version V3, V2, and V1 as indicated in FIG. 4. When, however, the result of the identification of the data conversion condition is negative, the process ends in action 504.

In an action 508, a version is selected and located using an index. The version may be the latest version V3 as illustrated in the example implementation and embodiment disclosed in FIG. 4. Alternatively, the selected version may be any other version, V2 or V1. This location step of the process may include converting the logical virtual disk address into a physical address for each version of data by pointing to an associated index using each bit of the logical virtual disk address. Further, the physical address of each version may be retrieved using the data stored in the index. Alternatively, a mapping table comprised of page table entries that provides address translations from system virtual addresses to physical addresses for memory pages of the mapped memory space or some other mapping means.

In an action 510, each block of the selected version is moved to a thin-provisioned virtual disk format 430 as shown in FIG. 4. Each block of the selected version is placed in the thin-provisioned virtual disk format 430 based upon the logical address offset 404 associated with each block. In particular the logical offset associated with the selected version of data may be scanned by the controller, where the controller determines which of the plurality of the logical block address (LBAs) is contiguous. Those that are contiguous are placed in the corresponding one block of the thin-provisioned in-place virtual disk.

In a decision action 512, it is determined whether a set of overwrites have occurred, where blocks of data are overwritten. The controller may look to the logical offset to determine whether the block of data has been overwritten. When the block of data has been overwritten, action 518 may be performed to compact each block to create a contiguous block from the remaining versions of data. The compacting may include moving each block not associated with the set of overwrites to the thin-provisioned format in-place virtual disk based upon the logical offset. The compacting may further include shifting each block of the set of overwrites, such that each block is adjacent to the next and the associated physical memory space is reclaimed of the previous position of each block. Accordingly, in step 520 the corresponding indexes of the versions can be modified to represent the new position of the blocks in the contiguous block.

When the block of data has not been overwritten, the block may be moved to the thin-provisioned in-place virtual disk, in an action 514. The controller or processor can use the logical offset to determine the corresponding location in which each of the untouched blocks of data are to be written in the thin-provisioned format in-place virtual disk. In particular, the logical offset of "2" may indicate that the block should be moved to the "2"nd position of the thin-provisioned format in-place virtual disk. As an addition corresponding action 516, the corresponding indexes of the versions can be modified to represent the new position of the blocks in the thin-provisioned format in-place virtual disk.

In an action 522, the read-optimized virtual disk format is designated as the thin-provisioned in-place virtual disk with the contiguous block. That is, the controller or processor now associates the combination of the thin-provisioned in-place virtual disk with the contiguous block as the representative read-optimized virtual disk format.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Figure 6:
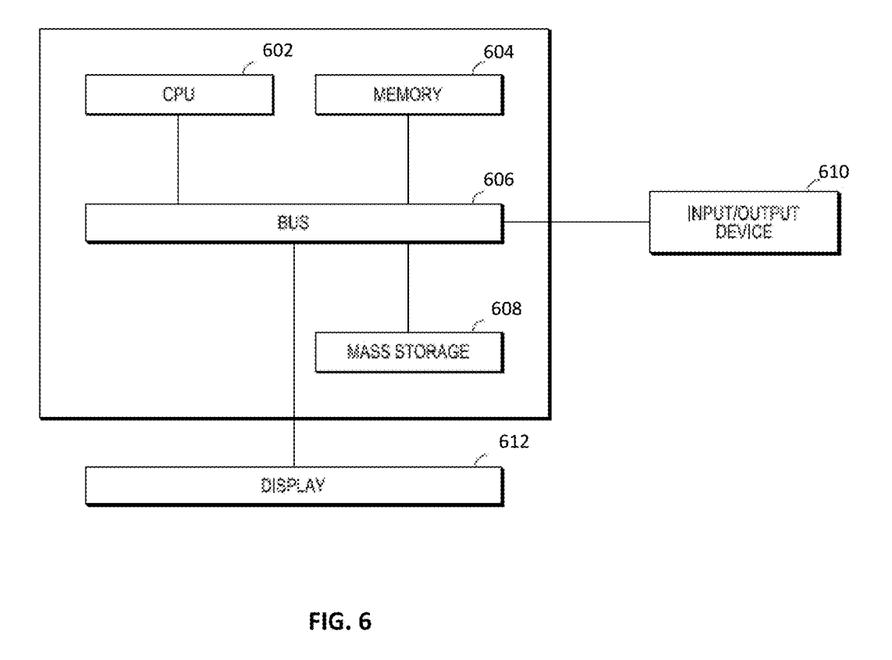
FIG. 6 is an illustration showing an exemplary computing device which may be implemented in the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for performing the conversion into a read-optimized virtual disk format in accordance with some embodiments. The computing device includes a central processing unit (CPU) 602, which is coupled through a bus 606 to a memory 604, and mass storage device 608. Mass storage device 608 represents a persistent data storage device such as a floppy disc drive or a fixed disc drive, which may be local or remote in some embodiments. The mass storage device 608 could implement a backup storage, in some embodiments. Memory 604 may include read only memory, random access memory, etc. Applications resident on the computing device may be stored on or accessed through a computer readable medium such as memory 604 or mass storage device 608 in some embodiments. Applications may also be in the form of modulated electronic signals modulated accessed through a network modem or other network interface of the computing device. It should be appreciated that CPU 602 may be embodied in a general-purpose processor, a special purpose processor, or a specially programmed logic device in some embodiments.

Display 612 is in communication with CPU 602, memory 604, and mass storage device 608, through bus 606. Display 612 is configured to display any visualization tools or reports associated with the system described herein. Input/output device 610 is coupled to bus 606 in order to communicate information in command selections to CPU 602. It should be appreciated that data to and from external devices may be communicated through the input/output device 610. CPU 602 can be defined to execute the functionality described herein to enable the functionality described with reference to FIGS. 1,2, 4, and 5. The code embodying this functionality may be stored within memory 604 or mass storage device 608 for execution by a processor such as CPU 602 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items. As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be Implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service-provider licensing software as a service on demand. The service provider may host the software, or may deploy the software to a customer for a given period of time. Numerous combinations of the above models are possible and are contemplated.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of converting a data format comprising:
   identifying a condition for when to make a data conversion from a write-optimized virtual disk format to a read-optimized virtual disk format;
   locating, in response to the identified condition, a version of data;
   moving the version of data to a thin-provisioned format virtual disk;
   detecting a set of overwrites from a remaining set of versions of the data, including blocks of data having been previously overwritten; and
   compacting each block within the set of overwrites to create a contiguous block such that an associated physical memory space is reclaimed, wherein the read-optimized virtual disk format of the data includes the thin-provisioned format virtual disk and the contiguous block.

2. The method of claim 1, further comprising:
   scanning, prior to moving the located version, a logical offset associated with the located version of data;
   determining which of a plurality of logical block addresses (LBAs) are contiguous; and
   generating a size for the thin-provisioned format virtual disk based upon the determination.

3. The method of claim 1, wherein the moving comprising:
   scanning a logical offset associated with the located version of data;
   determining a location corresponding to each one of a plurality of logical block addresses (LBAs); and
   placing, in response to the determining, each block of the version in a corresponding location of the thin-provisioned format virtual disk based upon the location of each one of a plurality of LBAs.

4. The method of claim 1, wherein the compacting comprising:
   moving each block not associated with the set of overwrites to the thin-provisioned format virtual disk based upon a logical offset; and
   shifting each block of the set of overwrites, such that each block is adjacent to the next and the associated physical memory space is reclaimed for the previous position of each block.

5. The method of claim 1, wherein the locating comprising:
   converting a logical virtual disk address into a physical address for each version of data;
   pointing to an associated index using each bit of the logical virtual disk address; and retrieving the physical address using the data stored in the index.

6. The method of claim 1, wherein the identifying comprising:
   using a rule from a policy to determine when the data conversion condition is met, wherein the rule is associated with a user-specified conversion request, an application-specified conversion request, a data conversion made upon a first recovery of a predetermined version, or a data conversion made upon request of a deletion of a version of data.

7. The method of claim 1, wherein the identifying comprising:
   using a rule based upon heuristics to determine when the data conversion condition is met, wherein the rule is associated with a data conversion made for data files above a predetermined size, a data conversion made for data having a small predetermined number of overwrites, a data conversion made for data having a large predetermined number of random writes, or a data conversion made periodically at a predetermined time.

8. A storage system comprising: a memory; and
a processor operable to:
identify a condition for when to make a data conversion from a write-optimized virtual disk format to a read-optimized virtual disk format;
locate, in response to the identified condition, a version of data;
move the version of data to a thin-provisioned format virtual disk;
detect a set of overwrites from a remaining set of versions of the data, including blocks of data having been previously overwritten; and
compact each block within the set of overwrites to create a contiguous block such that an associated physical memory space is reclaimed, wherein the read-optimized virtual disk format of the data includes the thin-provisioned format virtual disk and the contiguous block.

9. The storage system of claim 8, wherein the processor further operable to:
scan, prior to moving the located version, a logical offset associated with the located version of data;
determine which of a plurality of logical block addresses (LBAs) are contiguous; and
generate a size for the thin-provisioned format virtual disk based upon the determination.

10. The storage system of claim 8, wherein the move operation of the processor operable to: scan a logical offset associated with the located version of data;
determine a location corresponding to each one of a plurality of logical block addresses (LBAs); and
place, in response to the determining, each block of the version in a corresponding location of the thin-provisioned format virtual disk based upon the location of each one of a plurality of LBAs.

11. The storage system of claim 8, wherein the move operation of the processor operable to: move each block not associated with the set of overwrites to the thin-provisioned format virtual disk based upon a logical offset; and
shift each block of the set of overwrites, such that each block is adjacent to the next and the associated physical memory space is reclaimed for the previous position of each block.

12. The storage system of claim 8, wherein the locate operation of the processor operable to: convert a logical virtual disk address into a physical address for each version of data;
point to an associated index using each bit of the logical virtual disk address; and
retrieve the physical address using the data stored in the index.

13. The storage system of claim 8, wherein the identify operation of the processor operable to:
use a rule from a policy to determine when the data conversion condition is met, wherein the rule is associated with a user specified conversion request, an application specified conversion request, a data conversion made upon a first recovery of a predetermined version, or a data conversion made upon request of a deletion of a version of data.

14. The storage system of claim 8, wherein the identify operation of the processor operable to:
use a rule based upon heuristics to determine when the data conversion condition is met, wherein the rule is associated with a data conversion made for data files above a predetermined size, a data conversion made for data having a small predetermined number of overwrites, a data conversion made for data having a large predetermined number of random writes, or a data conversion made periodically at a predetermined time.

15. A non-transitory computer-readable medium including code for performing a method, the method comprising:
identifying a condition for when to make a data conversion from a write-optimized virtual disk format to a read-optimized virtual disk format;
locating, in response to the identified condition, a version of data;
moving the version of data to a thin-provisioned format virtual disk;
detecting a set of overwrites from a remaining set of versions of the data, including blocks of data having been previously overwritten; and
compacting each block within the set of overwrites to create a contiguous block such that an associated physical memory space is reclaimed, wherein the read-optimized virtual disk format of the data includes the thin-provisioned format virtual disk and the contiguous block.

16. The computer-readable medium of claim 15, further comprising:
scanning, prior to moving the located version, a logical offset associated with the located version of data;
determining which of a plurality of logical block addresses (LBAs) are contiguous; and
generating a size for the thin-provisioned format virtual disk based upon the determination.

17. The computer-readable medium of claim 15, wherein the moving comprising: scanning a logical offset associated with the located version of data;
determining a location corresponding to each one of a plurality of logical block addresses (LBAs); and
placing, in response to the determining, each block of the version in a corresponding location of the thin-provisioned format virtual disk based upon the location of each one of a plurality of LBAs.

18. The computer-readable medium of claim 15, wherein the compacting comprising: moving each block not associated with the set of overwrites to the thin-provisioned format virtual disk based upon a logical offset; and
shifting each block of the set of overwrites, such that each block is adjacent to the next and the associated physical memory space is reclaimed for the previous position of each block.

19. The computer-readable medium of claim 15, wherein the locating comprising: converting a logical virtual disk address into a physical address for each version of data;
pointing to an associated index using each bit of the logical virtual disk address; and retrieving the physical address using the data stored in the index.

20. The computer-readable medium of claim 15, wherein the identifying comprising:
using a rule from a policy to determine when the data conversion condition is met, wherein the rule is associated with a user specified conversion request, an application specified conversion request, a data conversion made upon a first recovery of a predetermined version, or a data conversion made upon request of a deletion of a version of data.

* * * * *